Jan. 27, 1925.
H. H. ERICKSON
DUST MOP
Filed July 25, 1924
1,524,295
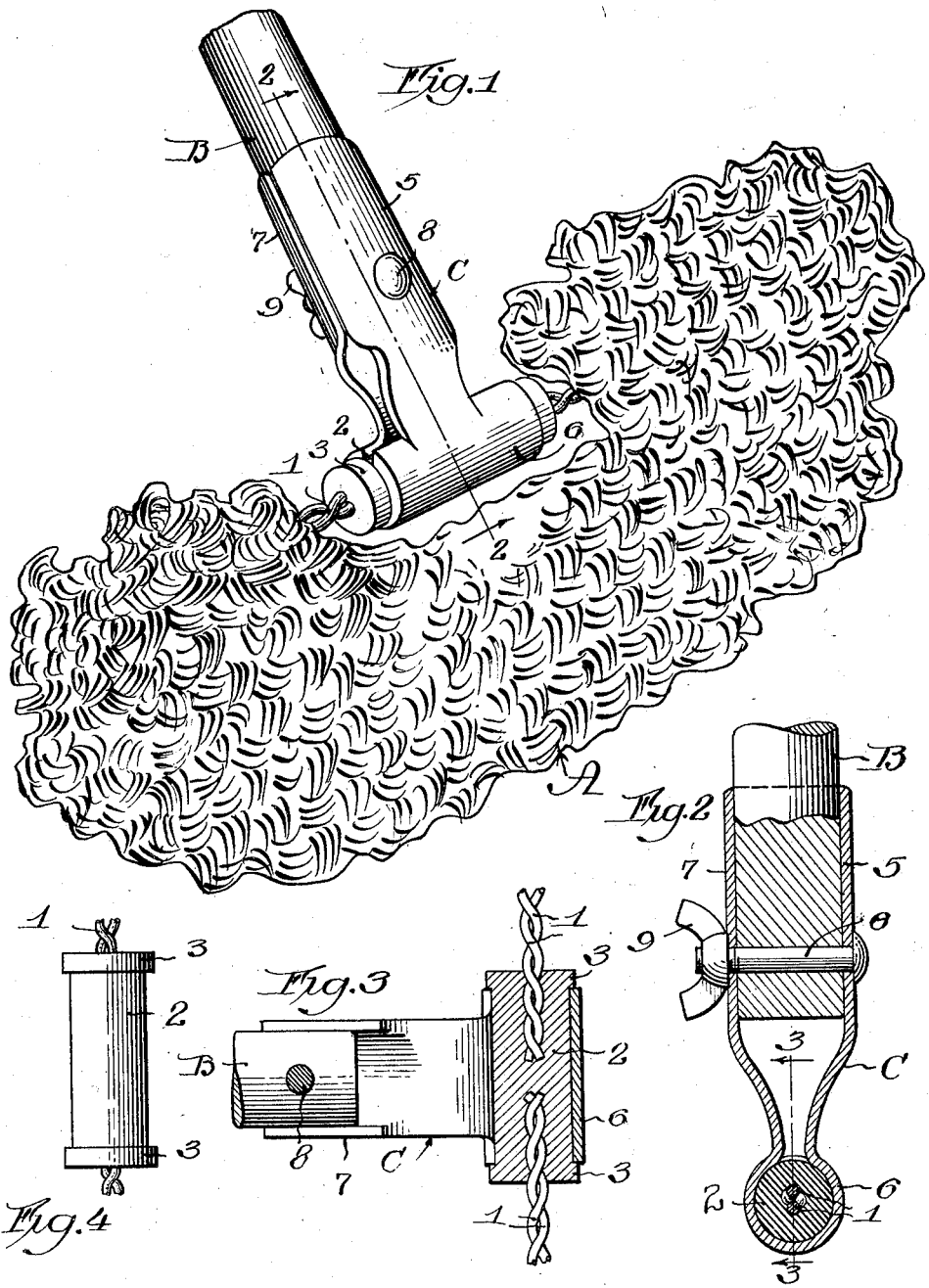

Patented Jan. 27, 1925.

1,524,295

UNITED STATES PATENT OFFICE.

HERBERT H. ERICKSON, OF CHICAGO, ILLINOIS, ASSIGNOR TO WEIL-RANSOM COMPANY, OF COOK COUNTY, ILLINOIS, A CORPORATION OF ILLINOIS.

DUST MOP.

Application filed July 25, 1924. Serial No. 728,087.

*To all whom it may concern:*

Be it known that I, HERBERT H. ERICKSON, a citizen of the United States of America, and a resident of Chicago, in the county of Cook and State of Illinois, have invented a certain new and useful Improvement in Dust Mops, of which the following is a specification.

This invention relates to dust mops and more particularly to a method and means for connecting the ends of the wire frame of the mop head and providing a swivel bearing to which the handle of the mop is attached.

A preferred embodiment of the invention is disclosed in the accompanying drawings, in which—

Figure 1 is a perspective view of a mop embodying the invention.

Fig. 2 is an enlarged detail view in horizontal section taken on line 2—2 of Fig. 1.

Fig. 3 is an enlarged detail view of the bearing as taken on line 3—3 of Fig. 2, and Fig. 4 is a view in elevation of the bearing as formed to receive the handle.

The mop herein disclosed is typical of a class of mops adapted for hardwood floors and for general dusting and cleaning purposes, consisting of a head A of soft material attached to a handle B by means of a suitable fitting C, permitting the head to swing or pivot on the handle.

The mop head is preferably made by twisting two strands of wire 1—1 together with a multitude of strands of yarn secured between the wires and forming a mass of cleaning material, when the wire is bent into the form of a rectangular frame with the ends brought together between the ends of the head thus formed.

In the present construction, the free ends of the wire are joined by a cylindrical body of metal 2, preferably solder. The connection is easily made by the use of solder, since a mold can be used for the purpose, and forms a strong and lasting joint. In addition to forming the joint it also provides a bearing for the handle fitting C, being about twice the diameter of the twisted wires and hence affording ample bearing surface. To prevent lateral displacement of the handle fitting, the ends of the bearing are flanged as at 3, the space between being surrounded by the sleeve portion 4 of the handle fitting C, the remaining portions being two semi-circular straps 5—5 which are clamped to the end of the handle B and held by a bolt 6 passing through the straps and handle and a wing nut 7 mounted at the end thereof.

The advantages of this construction are manifest. Solder being a metal readily molded into any desired form, provides a secure joint for the ends of the wires as well as a satisfactory bearing between the head of the mop and the handle.

I claim as my invention:

1. A dust mop comprising a head and a handle, and means for pivotally mounting said handle on said head comprising a cylindrical bearing member of metal molded around the frame of the mop head, and a handle connecting member in pivotal bearing engagement with said bearing member.

2. A dust mop comprising a head consisting of a frame of twisted wires bent into a predetermined shape, the ends of the wires being brought together and embedded in a cylindric body of solder, the same providing a bearing for the handle.

3. A dust mop consisting of a head and a handle in swivel connection therewith, said head comprising a wire frame, the ends thereof beng embedded in a cylindric body of solder substantially greater in diameter than the wire, the ends of said body being flanged and forming therebetween a bearing surface, and a handle connecting member in bearing contact with said bearing surface.

Signed at Chicago, Ill., this 7th day of July 1924.

HERBERT H. ERICKSON.